March 18, 1941. G. A. DE VLIEG 2,234,965
ROTARY CUTTER
Filed April 5, 1937
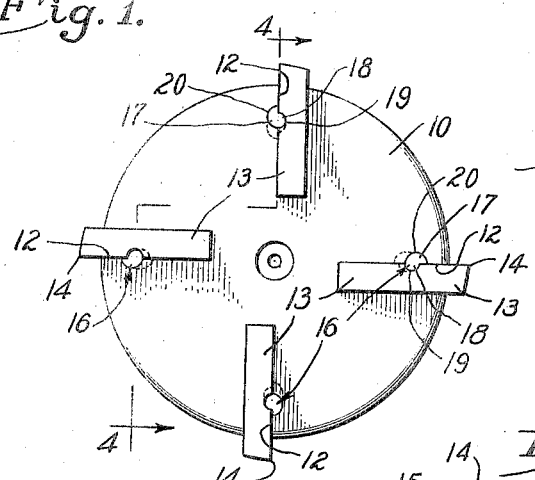
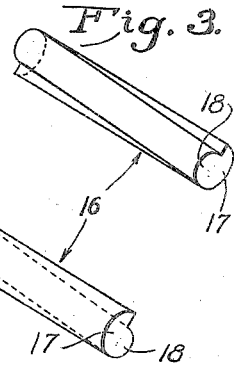
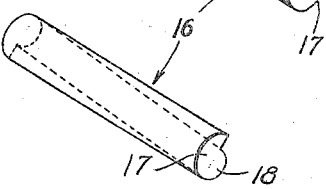
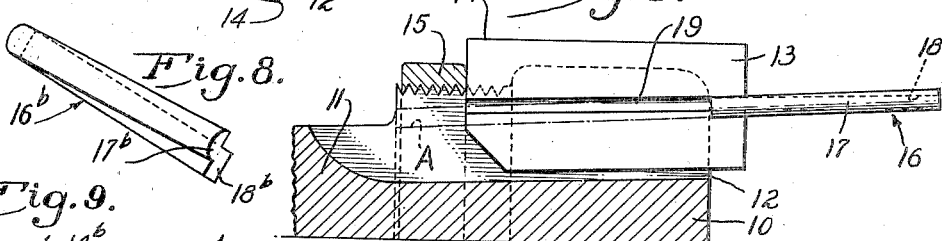
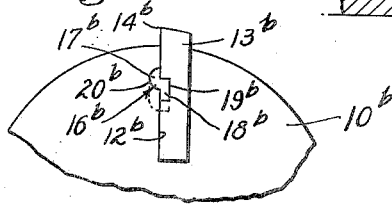
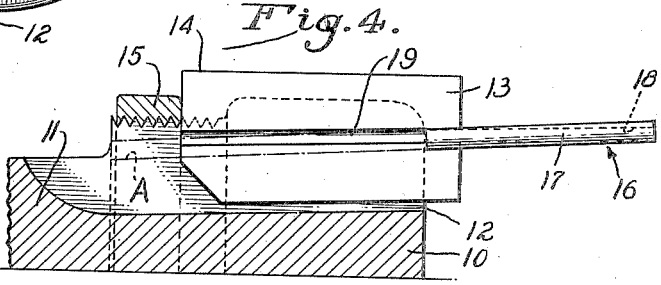
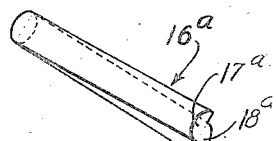
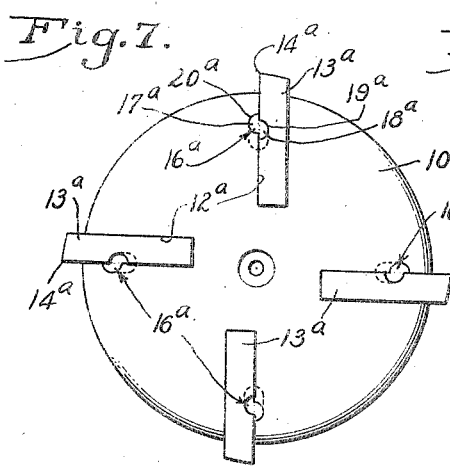
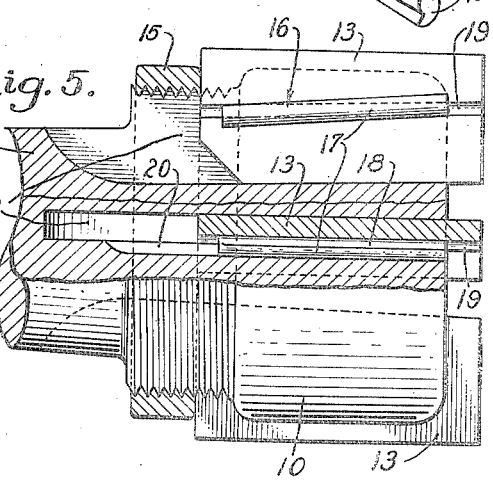
INVENTOR
Gerard A. DeVlieg
BY
ATTORNEYS Patented Mar. 18, 1941

2,234,965

UNITED STATES PATENT OFFICE 2,234,965

ROTARY CUTTER

Gerard A. De Vlieg, Rockford, Ill.

Application April 5, 1937, Serial No. 135,066

14 Claims. (Cl. 29—105)

The invention relates to improvements in rotary cutters, such as reamers and the like, embodying adjustable cutting elements and the primary aim of the invention is the provision of new and improved means for rigidly securing a cutting tool in the cutter assembly in any of its positions of relative adjustment.

A general object of the invention is to provide an improved means for securing a cutting tool in a cutter body which forces the tool into substantially a full length engagement between the base face of the tool and the root of a tool receiving recess, which makes a stronger blade possible without increasing the dimensions of the body or of the recess therein, and which avoids possibility of tool failure resulting from the engagement of the holding means with the tool.

Another object resides in the provision with a cutting element and the holding means therefor of novel unitary securing means adapted to prevent direct withdrawal of the cutting element and to exert a force which binds said element in rigid association with the holding means.

A further object is to provide, in a rotary cutter having a body recessed along a generally radial plane and a cutting element snugly seated in the recess for radial adjustment, a novel securing means for holding said element in said recess including an elongated member having oppositely disposed angularly related sections fashioned for engagement with complemental shoulders or grooves respectively formed in adjacent side faces of said recess and cutting element, the angular relationship being such that the cutting element is urged toward the base of the recess as the elongated member is inserted in said grooves.

Other objects and advantages will become apparent in the following description and from the accompanying drawing, in which:

Figure 1 is an end elevation of a rotary cutter embodying the features of the invention.

Fig. 2 is a perspective view of a unitary securing member.

Fig. 3 is a view similar to Fig. 2 but illustrating the reverse side of the securing member.

Fig. 4 is a fragmentary view in section along the face of a cutting element and illustrating the relationship of the parts immediately before assembly.

Fig. 5 is a longitudinal sectional view taken along the irregular line of section indicated by the line 4—4 of Fig. 1 and illustrating the assembled relation of the parts.

Fig. 6 shows in perspective an alternative form of securing member.

Fig. 7 is an end view of a cutter assembly employing the form of securing member illustrated in Fig. 6.

Fig. 8 is a perspective view of still another form of securing member.

Fig. 9 is a fragmentary end view of a cutter embodying the securing member of Fig. 8.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the exemplary embodiment of the invention, the body or holder of the cutter is designated generally at 10. Extending axially therefrom is a reduced extension 11 adapted to be secured in any suitable manner to conventional rotary drive means. Formed in the peripheral surface of the body and extending in a generally longitudinal direction is a plurality of slots or recesses 12 in which a series of cutting elements, tools or blades 13 are adjustably mounted. The slots preferably are equally spaced and the bottom, root or base surfaces thereof are slightly inclined inwardly from the end face of the body and radially toward the axis thereof.

Each blade has a suitable cutting edge 14 fashioned to lie in a cylinder of revolution corresponding to that of the bore to be reamed and the thickness dimension of the blade is such as to provide a close sliding fit between the blade and its receiving slot. The inner or base surface of the blade opposite to the cutting edge is formed on an angle complemental to the inclination of the root surface of the recess. Hence, when the blade is seated in a recess, the base of the blade and the root of the recess have flat surface contact throughout. An adjusting ring or nut 15 has screw threaded engagement with the body adjacent to the reduced extension 11 for abutment with the inner ends of the blades. The position of the blades longitudinally with respect to the inclined roots of the recesses determines the extent of radial adjustment of the blades and this position is fixed by abutment with the adjusting nut.

Means is provided for locking each of the blades in adjusted position. In the present instance, this means is in the form of a unitary element adapted to exert a wedging force between shoulders on a side wall of the recess and an adjacent side wall of the blade. The element is elongated so that the wedging force is exerted throughout a substantial portion of the blade and the force is primarily directed to seat the blade against the root of the recess.

In Figs. 2 and 3, one form of locking means is shown as comprising an elongated generally cylindrical member 16 composed of two integral longitudinal sections 17 and 18. Each section is semi-cylindrical in cross section and one section (in this instance the one designated 18) is of smaller radius and is disposed to extend angularly across what would be the flat face of the other section 17. In other words, the angular relationship of the two sections is on approximately an axial plane. The angular relationship of the axes of the two sections is sharply acute. The length of the pin is slightly less than that of a blade.

On one side face of the blade and approximately midway between the cutting edge and base thereof is a longitudinally extending groove or recess 19 (Figs. 3 and 4) of cross sectional form to receive snugly and slidably one section of the locking pin (herein the section 18). The side wall of the recess, which in assembly is opposed to the grooved wall of the blade is longitudinally grooved or recessed as at 20 (Fig. 4) to receive the other pin section 17. These grooves 19, 20 are located in side faces which extend generally radially of the body so that the angular relationship of the grooves is substantially in a radial plane of the body.

While the grooves 19 and 20 are so positioned that they may be brought into substantial registry at the exposed end face of the body, the axes of the grooves 19 and 20 have the same sharply acute angular relationship as the axes of the pin sections 17 and 18. This relationship is such that upon insertion of the locking pin sections into their respective grooves, the blade is moved toward and into rigid locked abutment against the root of the recess by the wedging action resulting from the angular relation of the pin sections and grooves. The action is clearly evident from a consideration of Fig. 4 wherein the dot and dash outline A indicates a projection of the body groove 20. In this particular arrangement, the blade groove 19 substantially parallels the plane of the blade base, while the recess groove 20 angles toward the root surface. The recess groove 20 has the greater angularity with respect to the axis of the cutter body.

To assemble the blade in its recess, the locking pin 16 is properly associated with the blade and these parts are then slid endwise into the body with the exposed section of the pin engaging the groove in the body until the blade engages the adjusting ring 15. The locking pin 16 is then drifted inwardly to clamp the base of the blade against the bottom of the recess.

To readjust the reamer, the blade may be drifted away from the ring 15, this being permitted since the blade groove 19 parallels the plane of the blade base. Then, the ring 15 is turned into the desired new position, and the blade is drifted back into engagement with the ring 15. The element 18 serves as a guide for the blade during the drifting movements, but if the pin 16 should become loosened it can be drifted back into wedge clamping position.

The pin 16 serves the double function of guiding and wedging the blade, the element 18 serving as a guide, and the element 17 acting as a wedge clamp. In any relative position of adjustment between the pin 16 and the blade, the latter is held without play or looseness in a fixed radial position, determined by the position of the pin in the groove 20 and without regard to whether or not it is clamped.

It is to be understood that, although the locking pin and the grooves are illustrated as being semi-circular in cross section, other angular forms could be as effectively used. Moreover, while the grooves preferably receive the pin sections snugly to prevent play of an unlocked blade, the locking wedge action results primarily from the insertion of a member between a radially inwardly facing shoulder on the body and an outwardly facing shoulder on the blade.

In Figs. 6 and 7, a modified form of assembly is shown wherein the pin elements are developed on the same radius, as indicated at 17$^a$ and 18$^a$, and the grooves 19$^a$ and 20$^a$ in the blades 13$^a$ and recesses 12$^a$ of the body 10$^a$ are correspondingly dimensioned.

Figs. 8 and 9 illustrate a third form in which each pin 16$^b$ has a wedging element 17$^b$ of a rounded form interfitting with a groove 20$^b$ in the associated recess 12$^b$ of the body 10$^b$, and a guiding element 18$^b$ rectangular in cross-section and interfitting with a complementary groove 19$^b$ in the front face of the blade 13$^b$. It will be understood that both longitudinal elements of the pin may be rectangular in cross-section.

From the foregoing, it will be evident that novel means has been provided for locking a blade or similar tool firmly and securely in a cutter body. The tool is seated firmly against the root of its receiving recess, thus utilizing the full depth of the recess in support of the blade. The locking force is exerted by a single unitary member along substantially the full length of the blade and primarily in a direction which seats the blade against the recess root. The locking force is, therefore, directed entirely in opposition to any force which might tend to unseat the blade. The invention permits the groove in the tool to be located at a substantial distance from either paralleling edge to minimize possible structural weakness resulting from said groove.

The blades are adjusted outwardly and resharpened to compensate for wear. The range of usefulness may be increased by interposing a shim in each of the recesses 12 between the root surfaces of the recesses and the base surface of the blades 13.

I claim as my invention:

1. A cutter comprising, in combination, a rotatable body having an outwardly opening slot therein defined by opposed side walls and a root surface disposed at an angle to the axis of said body, a blade snugly and slidingly fitting said slot and having a bottom face formed on an angle complemental to that of said root surface, a groove formed in adjacent side faces of said slot and said blade, the axis of the groove in said blade being substantially parallel with the plane of said bottom face and the groove in the slot face being at a sharply acute angle toward the plane of said root surface, and a locking pin freely slidable in said grooves and having angularly related sections respectively complemental to said grooves to produce upon insertion thereof into said grooves a wedging force for holding said blade seated against said root surface in any relative longitudinal position of adjustment.

2. A cutter comprising, in combination, a rotatable body provided with an elongated longitudinally extending slot having a root face sloping inwardly at an acute angle toward the body axis, an elongated blade fitting snugly and slidably in said slot and having a base formed on an angle complemental to that of said root face to provide full surface contact, adjusting means for determining the longitudinal position of said blade in said slot to adjust the radial position of the cutting edge of the blade, opposed longitudinal grooves in the side walls of said slot and blade having axes which intersect at a sharply acute angle, and an elongated pin having similarly angularly related sections adapted to fit respectively into said grooves, the angular relationships being such that the insertion of the pin into said grooves moves said blade toward and binds it against said root face in the position of longitudinal adjustment fixed by said adjusting means.

3. A cutter comprising, in combination, a rotatable body having an outwardly opening slot therein defined by opposed side walls and a root surface, a blade snugly and slidingly fitting said slot, grooves formed in adjacent side faces of said slot and said blade, the axes of said grooves intersecting at an acute angle with the axis of the groove in the face of said slot having the greater angularity with respect to the axis of the cutter, and a locking pin of substantial length having opposite longitudinal sections developed on the angular relationships of said grooves and fashioned for insertion into said grooves to lock the blade in said recess against said root surface.

4. A cutting device having, in combination, a supporting body provided with an elongated recess, a cutting element fitting snugly in said recess, adjacent side walls of said element and recess having elongated grooves therein formed respectively on axes which are angularly related, and an elongated securing member having elongated sections dimensioned and angularly related respectively to fit said grooves, the angular relationship being such as to move said element toward the base of said recess as said securing member is inserted in said grooves.

5. Locking means for securing a tool in a supporting body comprising an elongated member having longitudinal sections angularly related in substantially an axial plane for engagement with grooves of complementary relationship in the tool and body.

6. Locking means for securing a tool in a supporting body by the interpositioning of said means in opposed angularly extended grooves in said tool and body, comprising an elongated pin having opposite longitudinal sections which are angularly related in conformity with the angularity of said grooves and each of which is in cross section complemental to the cross section of the groove to be engaged thereby.

7. Locking means for securing a tool in a supporting body comprising an elongated member having a longitudinal section which is uniformly rectangular in cross-section, and a second longitudinal section of uniform cross section integral with and angularly related to said first mentioned section.

8. Locking means for securing a tool in a supporting body comprising an elongated member having a longitudinal section uniformly rectangular in cross-section, and a second longitudinal section of rounded form and angularly related to said first mentioned section.

9. Locking means for securing a tool in a supporting body comprising an elongated member having longitudinal angularly related sections rounded transversely respectively on unequal radii.

10. Locking means for securing a tool in a supporting body comprising an elongated member having longitudinal angularly related sections rounded transversely respectively on equal radii.

11. Locking means for securing a tool in a supporting body comprising an elongated member having longitudinal sections each of uniform cross sectional dimensions, said sections being arranged on longitudinal lines having an acute angular relation.

12. A cutter assembly having, in combination, a body having a blade receiving recess, a blade fitting snugly in said recess, opposed side walls of said blade and recess having longitudinal angularly related grooves therein, and a pin having opposed sections each complemental to and longitudinally freely slidable in a corresponding one of said grooves, said sections being angularly related according to the angular relationship of said grooves.

13. A cutter assembly having, in combination, a body having a blade receiving recess, a blade fitting snugly in said recess, said recess and said blade having longitudinal grooves in opposed side faces thereof, a locking pin having sections complemental to and engageable in said grooves, said pin sections having an angular relationship to each other providing the sole effective means for securing the blade in the recess.

14. A cutter assembly having, in combination, a body provided with a slot, a blade snugly fitting in said slot, the opposed side faces of said blade and slot having a recess therein, and a locking member having a section for engagement within each recess, the sections being angularly related and each being freely slidable longitudinally of its receiving recess, the angular relationship being such that as the member is moved lengthwise of the recesses the blade will move freely toward a seated position in the slot and the final movement of the pin wedges the blade in the slot.

GERARD A. DE VLIEG.